United States Patent [19]

Bird et al.

[11] 4,402,747
[45] Sep. 6, 1983

[54] RUST INHIBITING FOR STEEL

[75] Inventors: James E. Bird, Murrysville; Edward J. Helwig, Frazer Township, Allegheny County, both of Pa.

[73] Assignee: United States Steel Corporation, Pittsburgh, Pa.

[21] Appl. No.: 263,834

[22] Filed: May 15, 1981

[51] Int. Cl.³ .......................... C04B 9/02; C23F 11/14
[52] U.S. Cl. ................................ 106/14.42; 252/392; 252/389 R; 422/7; 106/14.41
[58] Field of Search .................. 252/392, 396, 389 R; 422/7; 106/14.41, , 14.42

[56] References Cited

U.S. PATENT DOCUMENTS 2,884,338  4/1959  Jenison ............................ 427/32 X
3,787,227  1/1974  Marans ............................ 252/392 X
3,826,673  7/1974  Smith et al. ..................... 428/624 X

FOREIGN PATENT DOCUMENTS 639917  4/1962  Canada ............................... 252/392

OTHER PUBLICATIONS

The Condensed Chemical Dictionary, 9th Edition, Hawley, Van Nostrand Reinhold Co. (1977), p. 785.

Primary Examiner—Richard D. Lovering
Assistant Examiner—C. S. Kilby
Attorney, Agent, or Firm—William L. Krayer

[57] ABSTRACT

Thin coatings of dioctyl sebacate, sodium benzoate, and certain sarcosine surfactants provide enhanced rust protection for steel. The sarcosine surfactant may range from 5 to 50 percent of the dioctyl sebacate, and the sodium benzoate should be in the range of 0.5 to about 1 percent of the total composition.

4 Claims, No Drawings

RUST INHIBITING FOR STEEL

BACKGROUND OF THE INVENTION

It has long been a problem in the steel industry to prevent and/or inhibit rusting of steel products, particular sheet such as is used in the appliance and container industries.

A common commercial treatment now employs dioctyl sebacate, such as is suggested in U.S. Pat. No. 2,884,338. Typically, a composition of dioctyl sebacate (DOS) is applied to a sheet such as container stock moving at high rates of speed. See the Smith and Bray U.S. Pat. No. 3,826,675 examples wherein a corrosion protection composition is deposited electrostatically at 1000 feet per minute. For treatments of container stock generally, the reader may also be interested in Allen U.S. Pat. Nos. 2,579,777 and 2,579,778 showing the use of tributyl citrate as the lubricant for container stock. See also U.S. Pat. Nos. 2,784,104; 2,790,778; 3,121,016 and 2,790,779.

Sodium benzoate is a known corrosion inhibitor also, but has been extremely difficult to apply, without the presence of water, to steel surfaces and has proven to cause problems in lacquer adhesion during the later stages of container production. It has other advantages in addition to corrosion inhibiting, however, such as being non-toxic, flavor-free, non-irritating, colorless, and odorless. The prior use of sodium benzoate as a corrosion inhibitor for steel in the form of a coating is discussed, among other places, in the April 1962 issue of Modern Packaging in an article by J. R. Hutchins and R. T. Knies.

In U.S. Pat. No. 3,121,016 the authors suggest the use of combinations of oleoyl N-methyl glycine with petroleum oil and sodium sulfonated petroleum oil.

The authors of U.S. Pat. No. 3,314,968 suggest the use as corrosion inhibitors of compositions similar to N-methyl glycine, namely, certain salts of naphthenoyl sarcosines, which can be made by reacting naphthenoyl chloride with sodium sarcosinate; barium naphthenoyl sarcosinate is used as a corrosion inhibitor in small amounts in an oil carrier, in examples VII and VIII.

We are aware of the recent use of combinations of DOS and certain alkyl sarcosines, specifically N-oleoyl sarcosine, as lubricating and corrosion inhibiting coatings for steel sheet. However, difficulties have been encountered in the use of these compositions. Specifically, in order to obtain adequate protection, it has been necessary to apply unnecessarily thick coatings, which is not only wasteful and expensive, but which results in significant capillary migrations after coiling or stacking. Obviously, any significant capillary migrations completely reverse whatever success has been achieved toward the end of even, uniform, continuous, and eye-hole-free coatings. Such capillary migrations result in a phenomenon known as puddling, an erratic and highly undesirable characteristic for further use of the steel product.

We are not aware, however, of any composition proposed or used in the prior art which contains the same components as ours or which employs them to achieve the excellent corrosion inhibiting results which we obtain.

SUMMARY OF THE INVENTION

Our invention employs as a coating or film corrosion inhibitor for steel a composition comprising DOS or ATBC, a sarcosine derivative having the general formula

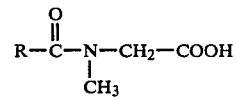

where R is a saturated or monounsaturated hydrocarbon group of eight to twenty carbon atoms, in an amount comprising about 1 to about 50% by weight based on the DOS or ATBC, and from about 0.5% to about 3%, preferably no more than about 1% by weight (of the entire composition) sodium benzoate.

All three of the components of our invention are known corrosion inhibitors in certain environments and under certain circumstances. The sarcosine derivatives which act as surfactants in our composition have some rust inhibiting effects of their own but if used alone, the rust inhibiting effects are significant only at high film weights which are too expensive but, perhaps more important, will cause lacquering problems. Sodium benzoate, in spite of its many advantages, can also cause lacquer adhesion problems and, perhaps even more significant, has been very difficult to apply to steel in thin films without the assistance of water. Neat DOS and neat ATBC have been effective, but as can be seen from our results, can be significantly improved through the use of our composition.

In order to demonstrate the effectiveness of our invention, some comparative tests were run in the laboratory, as follows:

The results of single-sheet humid-storage rust tests of panels from bench-scale filming experiments are shown in Table I. The results show that the DOS film alone provides some rust protection while ATBC (a commonly used tinplate lubricant) alone appears to accelerate corrosion, regardless of oil-film-coating weight. The addition of oleoyl sarcosine and sodium benzoate improved the performance of both lubricants; however, the film provided by the DOS solutions was superior to the ATBC film in all cases.

The results of stack-rust tests are presented in Table II and show the ATBC lubricant to be slightly more protective than DOS when used neat or with oleoyl sarcosine, but the DOS lubricant provides almost complete protection when both oleoyl sarcosine and sodium benzoate are added.

To confirm the bench-scale experimental results, the lubricants were applied electrostatically on a laboratory pilot line. The results of the single-sheet rust tests of the pilot-line material are presented in Table III and show that the performance levels for all combinations are improved over the test performance of specimens prepared on the bench. Stack-rust tests for specimens prepared on the pilot line are in progress and will be reported later.

Based on the pilot-line tests results, a trial using DOS with oleoyl sarcosine and sodium benzoate was held at a commercial installation, and single-sheet test results for this material are given in Table IV. The results indicate that the oil should provide excellent rust protection. From one oiled parent coil, several small coils were secured and wrapped to be examined at bimonthly intervals. Additional plate was sheared and stored unwrapped in the warehouse at user's plant. An inspection after 6 months' storage revealed that only the exposed surface of the top sheet had pinpoint rusted.

TABLE I

Single-Sheet Rust Test Ratings* Bench Scale Samples
(100° F., 85% RH)

| DOS | | | | ATBC | | | |
|---|---|---|---|---|---|---|---|
| Coating Weight, | Days | | | Coating Weight, | Days | | |
| g/bb | 1 | 5 | 8 | g/bb | 1 | 2 | |
| 0.20 | <1 | 2 | 9 | 0.20 | 8 | 8 | |
| 0.50 | <1 | 1 | 7 | 0.50 | 3** | 4** | |
| 1.00 | <1 | 2 | 4 | 1.00 | 1** | 7*** | |

+ Oleoyl Sarcosine

| Days | | | Oleoyl Sarcosine, | Days | | |
|---|---|---|---|---|---|---|
| 1 | 3 | 10 | % | 1 | 3 | 10 |
| <1 | 3 | 4 | 10 | <1 | 5 | 7 |
| 0 | <1 | 3.5 | 30 | <1 | 8 | 8 |
| 0 | <3 | 5 | 50 | 0 | 6 | 7 |
(oil coating weight 0.20 gm/bb)

+ Oleoyl Sarcosine + Sodium Benzoate

| | | | | Oleoyl Sarcosine, | Sodium Benzoate, | | | | |
|---|---|---|---|---|---|---|---|---|---|
| Days | | | | % | % | Days | | | |
| 7 | 13 | 19 | 26 | | | 7 | 13 | 19 | 26 |
| <1 | 1 | 1 | 5 | 10 | 1 | <1 | 2 | 4 | 7 |
| 0 | <1 | 1 | 4 | 30 | 1 | 1 | 3 | 4 | 6 |
| 0 | <1 | 1 | 4 | 50 | 1 | 2 | 4 | 5 | 7 |
(oil coating weight 0.20 gm/bb)

| | Days | | |
|---|---|---|---|
| | 1 | 5 | 8 |
| Dry Black Plate | 1 | 6*** | 8 |

*0 - perfect
10 - overall rust
**Rust on edges only
***Very light rust (rating is based on affected area)

TABLE II

Stack-Rust Test Ratings* Bench Scale Samples
(100° F., 85% RH)

| DOS | | | | ATBC | | | |
|---|---|---|---|---|---|---|---|
| Coating Weight, | Days | | | Coating Weight, | Days | | |
| g/bb | 8 | 28 | 56 | g/bb | 8 | 28 | 56 |
| 0.20 | 3 | 4 | 5 | 0.20 | 2 | 2 | 2 |
| 0.50 | 2 | 5 | 5 | 0.50 | 3 | 3 | 3 |
| 1.00 | 2 | 4 | 4 | 1.00 | 3 | 3 | 3 |

+ Oleoyl Sarcosine

| Days | | | Oleoyl Sarcosine, | Days | | |
|---|---|---|---|---|---|---|
| 6 | 26 | 47 | % | 6 | 26 | 46 |
| 3 | 3 | 4 | 10 | 0 | <1 | <1 |
| 2 | 3 | 3 | 30 | <1 | 2 | 2 |
| 2 | 3 | 3 | 50 | <1 | 2 | 2 |
(oil coating weight 0.20 gm/bb)

+ Oleoyl Sarcosine, + Sodium Benzoate

| Days | | | Oleoyl Sarcosine, % | Sodium Benzoate, % | Days | | |
|---|---|---|---|---|---|---|---|
| 6 | 1 | 47 | | | 6 | 26 | 47 |
| 0 | <1 | <1 | 10 | 1 | 0 | <1 | <1 |
| <1 | <1 | <1 | 30 | 1 | <1 | 2 | 2 |
| <1 | <1 | <1 | 50 | 1 | <1 | 2 | 2 |

| | Days | | | Days | | |
|---|---|---|---|---|---|---|
| Control | 8 | 28 | 56 | 6 | 26 | 47 |
| Dry Black Plate | 4 | 5 | 6 | 4 | 5 | 6 |

*0 - perfect
10 - overall rust

TABLE III

Single Sheet Rust Test - Pilot Line Oiled Black Plate
(100° F., 85 RH)

Lubricant

| DOS | | | | ATBC | | | |
|---|---|---|---|---|---|---|---|
| Coating Weight, | Days | | | Coating Weight, | Days | | |
| g/bb | 5 | 17 | 31 | g/bb | 5 | 17 | 31 |
| 0.18 | 1 | 3 | 3 | 0.16 | <1 | 2 | 4 |
| 0.24 | 1 | 1 | 2 | 0.39 | <1 | 2 | 3 |

+ 10% Oleoyl Sarcocine

| | | | | | 5 | 15 | 22 |
|---|---|---|---|---|---|---|---|
| 0.16 | 1 | 3 | 3 | 0.11 | 3 | 4 | 4 |
| 0.21 | <1 | <1 | 1 | 0.26 | 2 | 3 | 3 |

+ 30% Oleoyl Sarcosine

| 0.14 | <1 | <1 | 1 | 0.13 | 2 | 2 | 2 |
|---|---|---|---|---|---|---|---|
| 0.16 | <1 | <1 | 1 | 0.17 | 1 | 2 | 2 |

+ 50% Oleoyl Sarcosine

| 0.12 | <1 | <1 | 2 | 0.12 | 2 | 2 | 2 |
|---|---|---|---|---|---|---|---|
| 0.14 | <1 | 1 | 1 | 0.16 | 2 | 2 | 3 |

+ 10% Oleoyl Sarcosine + 1% Sodium Benzoate

| 0.09 | <1 | <1 | 1 | 0.18 | <1 | 1 | 2 |
|---|---|---|---|---|---|---|---|
| 0.18 | <1 | <1 | <1 | 0.19 | 1 | 1 | 2 |

+ 30% Oleoyl Sarcosine + 1% Sodium Benzoate

| 0.24 | <1 | <1 | 1 | 0.18 | 1 | 2 | 2 |
|---|---|---|---|---|---|---|---|
| 0.37 | <1 | <1 | 1 | 0.18 | 1 | 2 | 2 |

+ 50% Oleoyl Sarcosine + 1% Sodium Benzoate

| 0.22 | <1 | <1 | 1 | 0.17 | 1 | 1 | 1 |
|---|---|---|---|---|---|---|---|
| 0.28 | <1 | 1 | 2 | 0.20 | <1 | 1 | 1 |

+ 5% Oleoyl Sarcosine + ½% Sodium Benzoate

| 0.21 | <1 | 1 | 1 | 0.20 | <1 | <1 | <1 |
|---|---|---|---|---|---|---|---|
| 0.22 | 1 | 1 | 1 | 0.28 | 2 | 3 | 3 |

Control

TABLE III-continued

Single Sheet Rust Test - Pilot Line Oiled Black Plate
(100° F., 85 RH)

| Days | 5 | 17 | 31 |
|---|---|---|---|
|  | 4 | 5 | 5 |

0 - perfect
10 - overall rust

TABLE IV

Single-Sheet Rust Test Ratings - Mill Trial
(100° F., 85% RH)

DOS + 5% Oleoyl Sarcosine + ½% Sodium Benzoate

|  | 5 Days Exposure | | Oil Coating Weight, g/bb | |
|---|---|---|---|---|
|  | Top | Bottom | Top | Bottom |
| Coil No. 1 | <1 | <1 | 0.09 | 0.07 |
| Coil No. 2 | 1 | <1 | 0.06 | 0.07 |
| Control | 9 | 9 | Dry | |

0 - perfect
10 - overall rust

Based on bench-scale and pilot-line test results, a semi-commercial trial was conducted at a commercial installation using DOS blended with oleoyl sarcosine and an alcoholic solution of sodium benzoate as a rust-inhibiting lubricant for black plate.

Two coils were oiled using an electrostatic oiler, and the oil film results are presented in Table V. These coils, after approximately 2½ months' storage at the plant, were sheared at a user's plant and were found to be rust-free at that time. However, tests showed a further drop in oil-film level. Generally, for steel with this light of an oil film, sliding and piling of the sheets can be a problem; however, these sheets had adequate lubricity for the shearing and piling operation.

The composition used was DOS +5% oleoyl sarcosine +½% sodium benzoate.

A brief description of the test is as follows.

SINGLE SHEET RUST TEST (a) Cut samples to be tested into panels 4"×6".
(b) Provide at least 4 test panels for each sample to be tested.
(c) Place individual panels in racks in a near vertical position.
(d) Place racks and panels into constant-humidity temperature cabinet.
(e) The cabinet controls should be set to provide an 85% relative humidity at 100° F.
(f) Remove the racks of panels for grading after 1, 2, 4 and 7 days' storage. Grade on a 0 to 10 basis as in the stack rust test. The untreated panels should have grades of 9 or 10, and effective treatments should have values of 2 or better.

Grading times may vary.

STACK RUST TEST (a) Cut samples to be tested into panels 4"×6".
(b) Provide at least 5 panels for each sample to be tested.
(c) Provide cover sheets (top and bottom) to make a stack 4" high.
(d) Store packs (unwrapped) in cabinet in 85% relative humidity and 100° F.
(e) Grade after 7 days, after 14 days, and after 28 days' storage.
(f) Grade on the basis 0=no rust, 10=100% rust. The optimum time for comparison is dependent upon the steel used, but in general the 28-day test is the one that provides the biggest differences among treatments. Untreated controls should have grades in the range 7-10 and effective treatments should be 2 or better.

Grading times may vary.

TABLE V

DOS - Oleoyl Sarcosine - Sodium Benzoate Oil Film

| Oil Number | Sheet Position | Oil Film, g/bb* | | | |
|---|---|---|---|---|---|
|  |  | As-Made | | After 2½ Months | |
|  |  | Top | Bottom | Top | Bottom |
| 1 | Edge | 0.04 | 0.05 | 0.03 | 0.03 |
|  | Center | 0.17 | 0.12 | 0.08 | 0.09 |
|  | Edge | 0.06 | 0.06 | 0.04 | 0.05 |
| 2 | Edge | 0.04 | 0.04 | 0.03 | 0.03 |
|  | Center | 0.10 | 0.13 | 0.04 | 0.06 |
|  | Edge | 0.06 | 0.05 | 0.04 | 0.04 |

*Measured on Donart CA Ellipsometer.

Our compositions are used most advantageously in coating weights of from about 0.05 to 1.0 g/bb, preferably from 0.1–0.25 g/bb. As a quality control point for production a practical target is 0.20 g/bb ±0.05.

We claim:

1. Composition useful in inhibiting the corrosion of ferrous metals comprising (a) dioctyl sebacate, (b) oleoyl sarcosine in an amount from about 1% to about 50% by weight of the dioctyl sebacate, and (c) sodium benzoate in an amount from about 0.5% to about 3% by weight of the total of (a) and (b).

2. Method of inhibiting corrosion of ferrous metal container stock comprising applying thereto about 0.05 to about 1.0 g/bb of a composition comprising dioctyl sebacate, oleoyl sarcosine in an amount from about 1% to about 50% by weight of the dioctyl sebacate, and sodium benzoate in an amount from about 0.5% to about 3% by weight of the total of dioctyl sebacate and oleoyl sarcosine.

3. Composition useful in inhibiting the corrosion of ferrous metals comprising (a) acetyl tributyl citrate, (b) oleoyl sarcosine in an amount from about 1% to about 50% by weight of the dioctyl sebacate, and (c) sodium benzoate in an amount from about 0.5% to about 3% by weight of the total of (a) and (b).

4. Method of inhibiting corrosion of ferrous metal container stock comprising applying thereto about 0.05 to about 1.0 g/bb of a composition comprising acetyl tributyl citrate, oleoyl sarcosine in an amount from about 1% to about 50% by weight of the acetyl tributyl citrate, and sodium benzoate in an amount from about 0.5% to about 3% by weight of the total of acetyl tributyl citrate and oleoyl sarcosine.

* * * * *

UNITED STATES PATENT AND TRADEMARK OFFICE
CERTIFICATE OF CORRECTION

PATENT NO. : 4,402,747
DATED : September 6, 1983
INVENTOR(S) : James E. Bird and Edward J. Helwig It is certified that error appears in the above-identified patent and that said Letters Patent are hereby corrected as shown below:

In the References Cited, U.S. Patent Documents,

"3,826,673" should be -- 3,826,675 --.

Column 4, Table III, under "+50% Oleoyl Sarcosine", line 1, column 8, change "2" to -- 3 --.

Signed and Sealed this

Sixth Day of December 1983

[SEAL]

Attest:

GERALD J. MOSSINGHOFF

Attesting Officer

Commissioner of Patents and Trademarks